United States Patent
Sawata et al.

(10) Patent No.: US 11,599,311 B2
(45) Date of Patent: Mar. 7, 2023

(54) PRINTING MANAGEMENT APPARATUS AND NON-TRANSITORY COMPUTER READABLE MEDIUM STORING PRINTING MANAGEMENT PROGRAM

(71) Applicant: FUJIFILM Business Innovation Corp., Tokyo (JP)

(72) Inventors: Naohiro Sawata, Kanagawa (JP); Masanori Wada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 336 days.

(21) Appl. No.: 16/790,765

(22) Filed: Feb. 14, 2020

(65) Prior Publication Data
US 2021/0019097 A1    Jan. 21, 2021

(30) Foreign Application Priority Data
Jul. 19, 2019 (JP) .............................. JP2019-133614

(51) Int. Cl.
    *G06F 3/12* (2006.01)
(52) U.S. Cl.
    CPC .......... *G06F 3/1217* (2013.01); *G06F 3/1262* (2013.01); *G06F 3/1264* (2013.01)

(58) Field of Classification Search
    None
    See application file for complete search history.

(56) References Cited

U.S. PATENT DOCUMENTS

| 9,573,406 | B2 | 2/2017 | Oki et al. | |
| 2012/0212771 | A1* | 8/2012 | Goddard | G06F 3/1255 358/1.15 |
| 2015/0160904 | A1* | 6/2015 | Hayashi | G06F 3/125 358/1.15 |
| 2018/0113655 | A1* | 4/2018 | Sawata | G06F 3/1258 |

FOREIGN PATENT DOCUMENTS

JP    2014232440    12/2014

* cited by examiner

*Primary Examiner* — Frantz Bataille
(74) *Attorney, Agent, or Firm* — JCIPRNET

(57) ABSTRACT

A printing management apparatus includes a processor configured to generate a printing schedule based on a printing group, which is acquired by performing grouping on components that constitute a product for each attribute and in which is possible to change a printing order of the components in the group on which the grouping is performed, in a case where the product is manufactured using a printing apparatus and a post processing apparatus, and generate a post processing schedule based on a post processing group which is acquired by performing grouping on the product constituted by the components included in the printing group.

20 Claims, 13 Drawing Sheets

FIG.6

| PRINTING GROUP LIST SCREEN | | INSTRUCT TO PERFORM PROCESSING... | REISSUE PRINTING ORDER | REPRINT COMPONENT... | RE-PREPRESS | REPORT COMPLETION OF PRINTING ▽ | CHANGE SCHEDULED RECEPTION DATE AND TIME... ↻ | | SEARCH 🔍 | |
|---|---|---|---|---|---|---|---|---|---|---|
| GROUP JOB ID ▽ | SCHEDULED SHIPPING DATE AND TIME ▽ | | | PROGRESS/STATUS | | GROUPING CONDITION NAME | PRINTING MACHINE NAME (SCHEDULED) ▽ | SCHEDULED PRINTING START DATE AND TIME | SCHEDULED TIME REQUIRED FOR PRINTING | BOOKBINDING SPECIFICATION NAME ▽ |
| 0000002391 | 07/30/2019 17:00 | | | 🖨▶ BEING PREPRESSED △ SCHEDULED PRINTING COMPLETION DATE AND TIME ELAPSE. | | PROCESS | PRINTING 3 | 07/05/2019 09:00 | 00:35:00 | WIRELESS BINDING (PUR) |
| PRODUCT JOB ID | CUSTOMER INFORMATION-NAME | PRODUCT NAME | COMPONENT NUMBER | COMPONENT NAME | COMPONENT STATUS | | NUMBER OF COPIES | NUMBER OF ORDERS | NUMBER OF RESERVES FOR EXTERNAL PROCESSING | NUMBER OF RESERVES FOR INTERNAL PROCESSING |
| D0001 | ABC | XYZ | 2 | BODY | 🖨▶ BEING PREPRESSED △ SCHEDULED PRINTING COMPLETION DATE AND TIME ELAPSE. | | 5 | 5 | 1 | 1 |
| D0002 | ABC | XYZ | 2 | BODY | 🖨▶ BEING PREPRESSED △ SCHEDULED PRINTING COMPLETION DATE AND TIME ELAPSE. | | 5 | 5 | 1 | 1 |
| D0003 | ABC | XYZ | 2 | BODY | 🖨▶ BEING PREPRESSED △ SCHEDULED PRINTING COMPLETION DATE AND TIME ELAPSE. | | 5 | 5 | 1 | 1 |
| D0004 | ABC | XYZ | 2 | BODY | 🖨▶ BEING PREPRESSED △ SCHEDULED PRINTING COMPLETION DATE AND TIME ELAPSE. | | 5 | 5 | 1 | 1 |
| D0005 | ABC | XYZ | 2 | BODY | 🖨▶ BEING PREPRESSED △ SCHEDULED PRINTING COMPLETION DATE AND TIME ELAPSE. | | 5 | 5 | 1 | 1 |

FIG. 7

| POST PROCESSING GROUP LIST SCREEN | | | INSTRUCT TO PERFORM PRINTING... | REISSUE PROCESSING ORDER | REPORT COMPLETION OF PROCESSING | REPRINT | | | SEARCH | |
|---|---|---|---|---|---|---|---|---|---|---|
| PROCESSING GROUP ID | PRODUCT JOB ID | SCHEDULED SHIPPING DATE AND TIME | | | CLIENT INFORMATION-NAME | PRODUCT NAME | | NUMBER OF COPIES | NUMBER OF ORDERS | NUMBER OF RESERVES |
| 24023 | D0001 | 07/30/2019 17:00 | | | ABC | XYZ | | 5 | 5 | 2 |
| 24023 | D0002 | 07/30/2019 17:00 | | | ABC | XYZ | | 5 | 5 | 2 |
| 24023 | D0003 | 07/30/2019 17:00 | | | ABC | XYZ | | 5 | 5 | 2 |
| 24023 | D0004 | 07/30/2019 17:00 | | | ABC | XYZ | | 5 | 5 | 2 |
| 24023 | D0005 | 07/30/2019 17:00 | | | ABC | XYZ | | 5 | 5 | 2 |
| 24023 | D0006 | 07/30/2019 17:00 | | | ABC | XYZ | | 5 | 5 | 2 |
| 24023 | D0007 | | | | | | | | | |

FIG. 8

POST PROCESSING SCHEDULE SCREEN

| PROCESSING GROUP ID | FORMAT NAME | | PAPER BRAND NAME OF BODY | |
|---|---|---|---|---|
| 24023 | A5 | | AMBER N | |

PRODUCT INFORMATION

| PROCESSING ORDER | PRODUCT JOB ID | NUMBER OF COPIES | PRODUCT NAME | PRODUCT STATUS |
|---|---|---|---|---|
| 1 | D0010 | 5 | XYZ | ▸ BEING PREPRESSED |
| 2 | D0009 | 5 | XYZ | ▸ BEING PREPRESSED |
| 3 | D0008 | 5 | XYZ | ▸ BEING PREPRESSED |
| 4 | D0007 | 5 | XYZ | ▸ BEING PREPRESSED |
| 5 | D0006 | 5 | XYZ | ▸ BEING PREPRESSED |
| 6 | D0005 | 5 | XYZ | ▸ BEING PREPRESSED |
| 7 | D0004 | 5 | XYZ | ▸ BEING PREPRESSED |

CLOSE

FIG. 9

| SCREEN FOR SETTING PRINTING-GROUPING ATTRIBUTE | ☒ |

NAME *

ITEM
- ☐ CUSTOMER ID
- ☐ DESIGNATE CUSTOMER ID
- ☐ NUMBER OF COLORS (FRONT)
  - ☐ 0124
- ☐ NUMBER OF COLORS (REAR)
  - ☐ 0124
- ☐ COMPONENT ID
- ☐ PAPER ID
- ☐ PAPER DIMENSION
- ☐ PAGINATION TYPE ID

- ☑ SCHEDULED OUTPUT APPARATUS
- ☑ CUT & STACK FLAG
- ☐ SCHEDULED SHIPPING DATE AND TIME
- ☐ PROCESSING MACHINE ID
- ☐ BOOKBINDING SPECIFICATION NAME
- ☐ FORMAT ID
- ☐ SHAPE OF NEEDLE
- ☐ DESIGNATE SHAPE OF NEEDLE
- ☐ NUMBER OF NEEDLES
- ☐ DESIGNATE NUMBER OF NEEDLES
  - (1 TO 99)

- ☐ USE PASTE
- ☐ EXISTENCE/NON-EXISTENCE OF ASF USE
- ☐ DESIGNATE NUMBER OF ASF USES
  - (1 TO 5)
- ☐ REAM WEIGHT
- ☐ ARRANGE COMPONENT WHICH IS ENOUGH FOR PROCESSING
- ☑ PRINTING MODE OF PRINTING MACHINE
- ☐ NUMBER OF PAGINATIONS

COMMENT

[ CANCEL ] [ OK ]

FIG. 10

| SCREEN FOR SETTING GENERAL SCHEDULING | | |
|---|---|---|
| TASK SETTING ▲ | SCHEDULING SETTING | |
| WORKING DAY/HOLIDAY WORKING SHIFT | GENERAL \| PRIORITY IN GROUP JOB \| PRIORITY AMONG GROUP JOBS \| PRIORITY OF PROCESSING | |
| USER GROUP SETTING | INTERVAL FROM END OF PRINTING TO START OF PROCESSING (TIME: MINUTE) | |
| USER SETTING | 4  (0 TO 23) : 0  (0 TO 59) | |
| PRINTING MACHINE/ ▲ PROCESSING MACHINE SETTING | TIME REQUIRED FOR INSPECTION (TIME: MINUTE) | |
| PRINTING MACHINE | 2  (0 TO 23) : 0  (0 TO 59) | |
| PROCESSING MACHINE | TIME REQUIRED FOR SHIPPING (TIME: MINUTE) | |
| MANAGEMENT SETTING ▲ | 2  (0 TO 23) : 0  (0 TO 59) | |
| GROUP JOB | SCHEDULE PREPARATION TARGET PERIOD (PERIOD: DAY) | |
| SCHEDULING | 60  (14 TO 60) | |
| HISTORY | ☑ ALIGN PROCESSING WITH GROUP CONFIGURATION OF BODY<br>   ○ ALIGN IN REVERSE ORDER OF PRINTING<br>   ○ ALIGN IN IDENTICAL ORDER TO PRINTING | |
| PROCESS START TIME | ☑ AUTOMATICALLY RELEASE POSTPONED ORDER<br>    CANCEL IN CASE WHERE NUMBER OF REMAINING DAYS UNTIL SCHEDULED SHIPPING DATE AND TIME BECOMES NUMBER OF DAYS BELOW (WORKING DAY) | |
| EXTERNAL SYSTEM COOPERATION | 3  (1 TO 60) | |
| | ☑ DISPLAY WARNING TO COMPONENT, SCHEDULED SHIPPING DATE AND TIME OF WHICH COME CLOSE AND ON WHICH PRINTING IS NOT COMPLETED (WORKING DAY) | |
| | 3  (1 TO 60) | |
| | ☑ DISPLAY WARNING TO PRODUCT, SCHEDULED SHIPPING DATE AND TIME OF WHICH COME CLOSE AND ON WHICH PROCESSING IS NOT COMPLETED (WORKING DAY) | |
| | 3  (1 TO 60) | |
| | | DESTROY EDIT  APPLY  CLOSE |

FIG. 11

SCREEN FOR SETTING PRIORITY IN PRINTING GROUP

CONDITIONAL ITEM LIST

- NUMBER OF PAGES
- FINISHED AREA
- PROCESSING TYPE ID
- JOB ID
- SHORTEST SCHEDULED SHIPPING DATE AND TIME
- TOTAL NUMBER OF PAGES (NUMBER OF PAGES × NUMBER OF COPIES)
- BUNDLE THICKNESS
- BOOKBINDING SPECIFICATION ID
- NUMBER OF NEEDLES
- SHAPE OF NEEDLE
- EXISTENCE/NON-EXISTENCE OF ASF USE (NUMBER OF USES)

CONDITIONAL ITEM IN SETTING

ORDER OF SUBMISSION | ASCENDING ORDER

[OK] [CANCEL]

FIG. 12

SCREEN FOR SETTING PRIORITY AMONG PRINTING GROUPS

CONDITIONAL ITEM IN SETTING

GROUP JOB ID | ASCENDING ORDER ▽

[OK]
[CANCEL]

CONDITIONAL ITEM LIST

| DUE DATE | NUMBER OF PAGES | NUMBER OF COPIES | PAGINATION NUMBER | PROCESSING TYPE ID | ORDER OF SUBMISSION | FORMAT ID | PAPER ID | EXISTENCE/NON-EXISTENCE OF USE OF PASTE | NUMBER OF NEEDLES | SHAPE OF NEEDLE | BOOKBINDING SPECIFICATION ID |

FIG. 13

SCREEN FOR SETTING PRIORITY AMONG POST PROCESSING GROUPS

CONDITIONAL ITEM IN SETTING

ORDER OF SUBMISSION | ASCENDING ORDER ▽

[OK]
[CANCEL]

CONDITIONAL ITEM LIST

- SCHEDULED DATE OF WORK FOR ITEM OPERATION
- FORMAT ID
- PAPER ID
- EXISTENCE/NON-EXISTENCE OF USE OF PASTE
- NUMBER OF NEEDLES
- SHAPE OF NEEDLE
- SCHEDULED SHIPPING DATE AND TIME
- PLATEMAKING PAGINATION NUMBER OF GROUP JOB OF BODY

PRINTING MANAGEMENT APPARATUS AND NON-TRANSITORY COMPUTER READABLE MEDIUM STORING PRINTING MANAGEMENT PROGRAM

CROSS-REFERENCE TO RELATED APPLICATIONS

This application is based on and claims priority under 35 USC 119 from Japanese Patent Application No. 2019-133614 filed Jul. 19, 2019.

BACKGROUND

(i) Technical Field

The present invention relates to a printing management apparatus and a non-transitory computer readable medium storing a printing management program.

(ii) Related Art

For example, JP2014-232440A discloses a management apparatus which controls an order for managing a plurality of types of commodities using a printing apparatus and a post processing apparatus. The management apparatus includes an acquisition unit that acquires pieces of information of a plurality of commodities to be manufactured, and a step management unit that manages pieces of step information relevant to a plurality of steps for manufacturing the commodities for respective types of the commodities. The management apparatus includes an order determination unit that determines an order for manufacturing the plurality of commodities based on the pieces of information of the plurality of commodities and the pieces of step information, and a control unit that causes the printing apparatus and the post processing apparatus to manufacture the plurality of commodities according to the order determined by the order determination unit. The order determination unit determines the order such that identical types of commodities are continuously manufactured in the printing apparatus and the post processing apparatus.

SUMMARY

However, for example, in a printing apparatus which performs printing on a continuous paper, printed materials of various products are printed by one roller, and post processing is performed on the printed materials in units of a roller. In printing or the like for various kinds and a small quantity, there is a case where grouping is performed on components, which constitute a product, for each attribute and processing is performed with continuity in order to improve efficiency of the printing. However, in post processing, there is a case where grouping is not taken into a consideration in a printing step, and the post processing is not effectively performed after the printing.

Aspects of non-limiting embodiments of the present disclosure relate to a printing management apparatus and a non-transitory computer readable medium storing a printing management program, which are capable of preparing a post processing schedule after the printing by taking grouping in the printing step into consideration.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing management apparatus includes a processor configured to generate a printing schedule based on a printing group, which is acquired by performing grouping on components that constitute a product for each attribute and in which it is possible to change a printing order of the components in the group on which the grouping is performed, in a case where the product is manufactured using a printing apparatus and a post processing apparatus, and generate a post processing schedule based on a post processing group which is acquired by performing grouping on the product constituted by the components included in the printing group.

BRIEF DESCRIPTION OF THE DRAWINGS

Exemplary embodiment(s) of the present invention will be described in detail based on the following figures, wherein:

FIG. 6 is a front diagram illustrating an example of a printing group list screen according to the exemplary embodiment;

FIG. 7 is a front diagram illustrating an example of a post processing group list screen according to the exemplary embodiment;

FIG. 8 is a front diagram illustrating an example of a post processing schedule screen according to the exemplary embodiment;

FIG. 9 is a front diagram illustrating an example of a screen for setting a printing-grouping attribute according to the exemplary embodiment;

FIG. 10 is a front diagram illustrating an example of a screen for setting general scheduling according to the exemplary embodiment;

FIG. 11 is a front diagram illustrating an example of a screen for setting a priority in the printing group according to the exemplary embodiment;

FIG. 12 is a front diagram illustrating an example of a screen for setting the priority among the printing groups according to the exemplary embodiment; and FIG. 13 is a front diagram illustrating an example of a screen for setting the priority among the post processing groups according to the exemplary embodiment.

DETAILED DESCRIPTION

Hereinafter, an example of a form to carry out the present invention will be described in detail with reference to the accompanying drawings.

Figure 1:
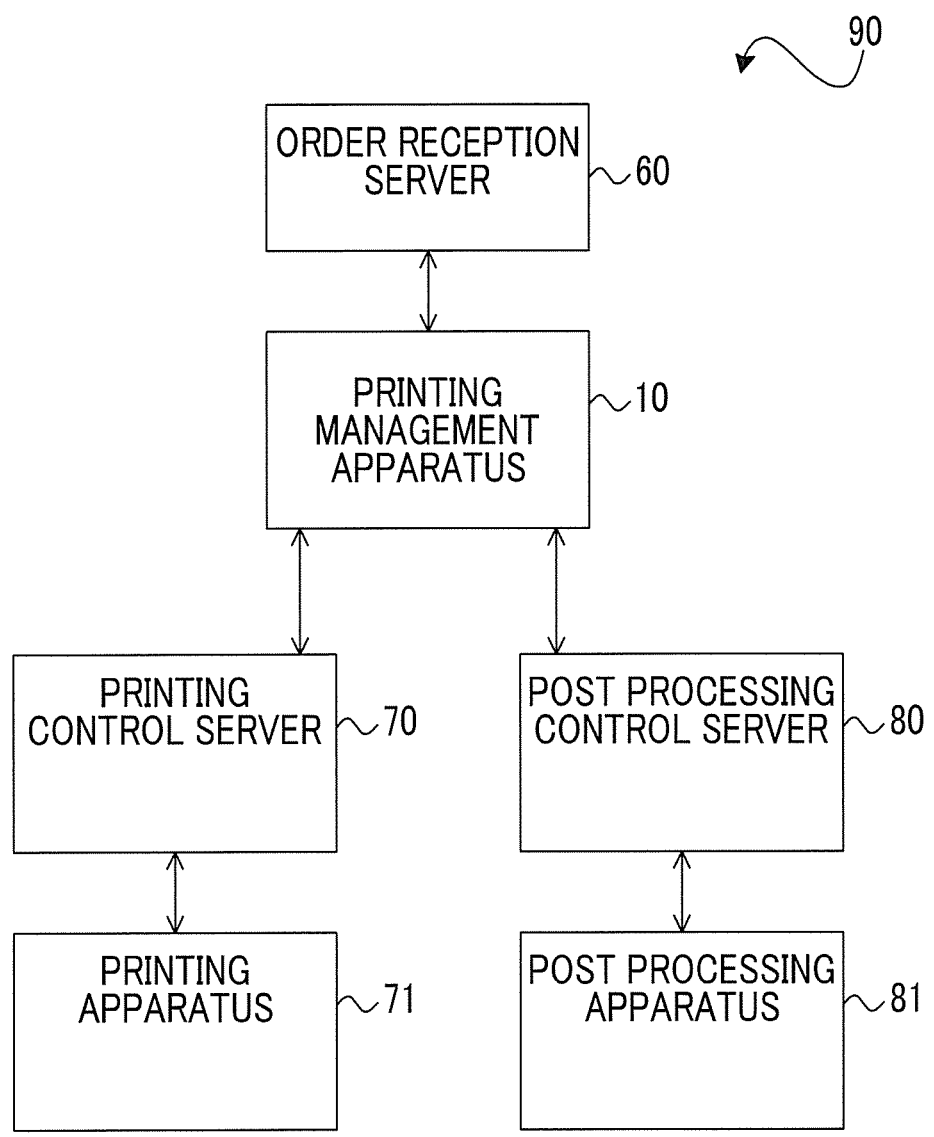
FIG. 1 is a diagram illustrating an example of a configuration of a printing management system according to an exemplary embodiment.

FIG. 1 is a diagram illustrating an example of a configuration of a printing management system 90 according to an exemplary embodiment.

As illustrated in FIG. 1, the printing management system 90 according to the exemplary embodiment includes a printing management apparatus 10, an order reception server 60, a printing control server 70, and a post processing control server 80.

The order reception server 60 is connected to the printing management apparatus 10 through wired communication or wireless communication. The order reception server 60 receives orders of various products from clients, and transmits pieces of order reception information indicative of content of the received orders of the products to the printing management apparatus 10.

For example, a general-purpose computer apparatus, such as a server computer or a Personal Computer (PC), is applied to the printing management apparatus 10. The printing management apparatus 10 is connected to each of the printing control server 70 and the post processing control server 80 through the wired communication or the wireless communication. The printing management apparatus 10 transmits printing control information for controlling a printing step to the printing control server 70 based on the pieces of order reception information received from the order reception server 60, and transmits pieces of post processing control information for controlling a post processing step to the post processing control server 80. The post processing step is a step for performing a post processing to be performed after the printing step.

The printing control server 70 is connected to the printing apparatus 71 through the wired communication or the wireless communication. A plurality of printing apparatuses 71 may be provided. The printing apparatus 71 executes printing according to the pieces of printing control information received from the printing control server 70. Paper, which is used as a printing target by the printing apparatus 71, may be, for example, continuous paper, such as rolled paper, or may be cut paper which is previously cut in a prescribed size.

The post processing control server 80 is connected to the post processing apparatus 81 through the wired communication or the wireless communication. A plurality of post processing apparatuses 81 may be provided. The post processing apparatus 81 executes the post processing according to the pieces of post processing control information received from the post processing control server 80. The post processing includes, for example, a process of performing a processing of coating a printing surface with varnish in order to suppress damage or dirt from adhering to the printing surface of a printed material (hereinafter, referred to as "sheet") on which printing is performed in the printing step, a process of making a form of a book by binding sheets of body in a state of being folded to be aligned in a page order and attaching a cover, and a process of cutting margins of the bound book and finishing with a predetermined size.

The printing management apparatus 10 manages a printing schedule of the printing apparatus 71 and a post processing schedule of the post processing apparatus 81. Specifically, the printing management apparatus 10 generates the printing schedule of the printing apparatus 71, and manages the printing step according to the generated printing schedule. In addition, the printing management apparatus 10 generates the post processing schedule of the post processing apparatus 81, and manages the post processing step according to the generated post processing schedule.

Meanwhile, the printing management apparatus 10 may include a function of the printing control server 70 and a function of the post processing control server 80. In this case, the printing management apparatus 10 directly controls each of the printing apparatus 71 and the post processing apparatus 81.

Figure 2:
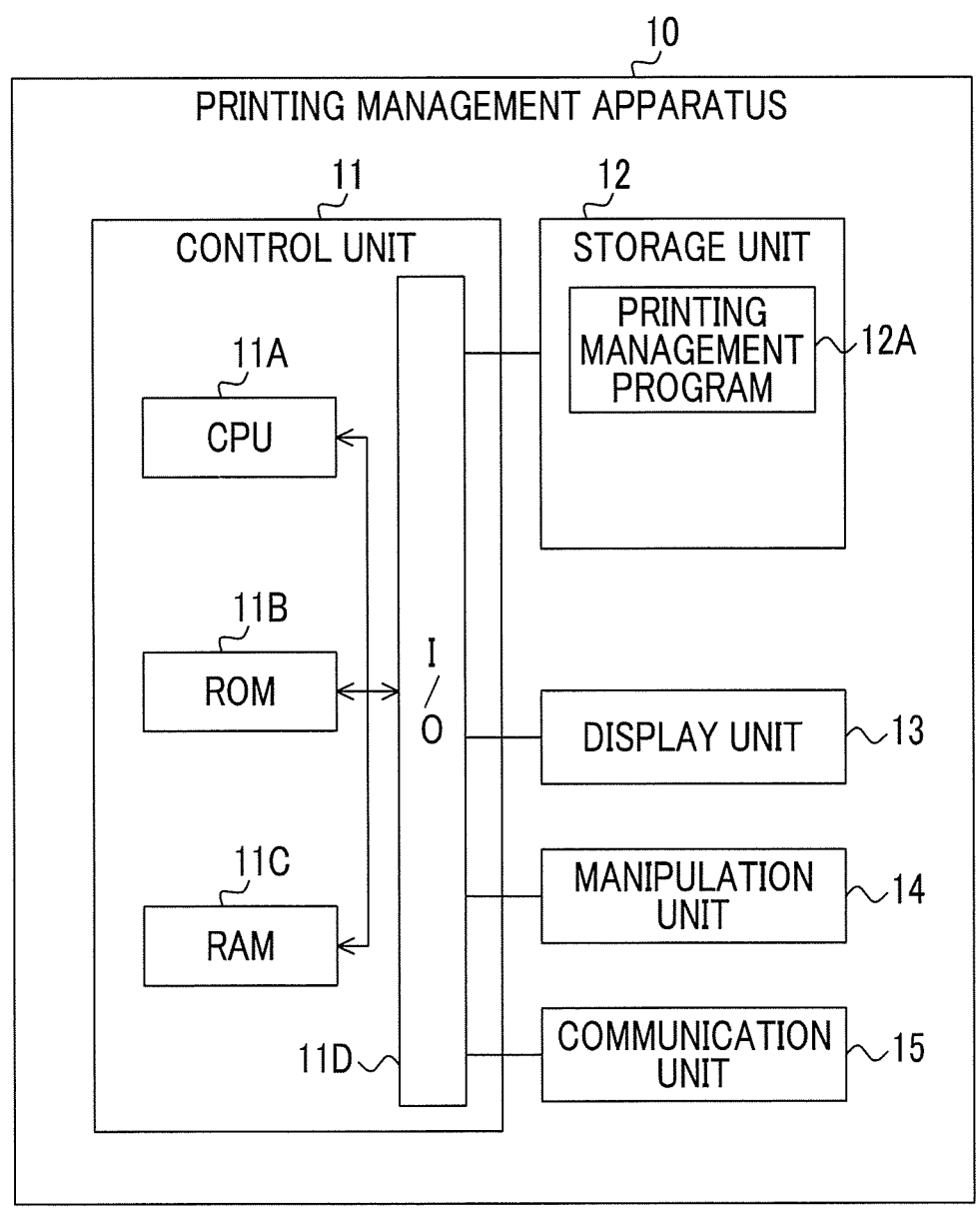
FIG. 2 is a block diagram illustrating an example of an electrical configuration of a printing management apparatus according to the exemplary embodiment.

FIG. 2 is a block diagram illustrating an example of an electrical configuration of the printing management apparatus 10 according to the exemplary embodiment.

As illustrated in FIG. 2, the printing management apparatus 10 according to the exemplary embodiment includes a control unit 11, a storage unit 12, a display unit 13, a manipulation unit 14, and a communication unit 15.

The control unit 11 includes a Central Processing Unit (CPU) 11A, a Read Only Memory (ROM) 11B, a Random Access Memory (RAM) 11C, and an input and output interface (I/O) 11D, and the respective units are connected respectively through a bus.

Respective functioning units, which include the storage unit 12, the display unit 13, the manipulation unit 14, and the communication unit 15, are connected to the I/O 11D. The respective functioning units are capable of mutually communicating with the CPU 11A through the I/O 11D.

The control unit 11 may be formed as a sub control unit which controls some operations of the printing management apparatus 10, or may be formed as a part of a main control unit which controls an operation of an entirety of the printing management apparatus 10. For example, an integrated circuit, such as a Large Scale Integration (LSI), or an Integrated Circuit (IC) chip set is used for some or the entirety of the respective blocks of the control unit 11. Individual circuits may be used for the respective blocks or a circuit, in which some or the entirety of the respective blocks are integrated, may be used. The respective blocks may be integrally provided, or some blocks may be separately provided. In addition, in each of the blocks, some of the blocks may be separately provided. While being not limited to the LSI, a dedicated circuit or a general-purpose processor may be used for integration of the control unit 11.

For example, a Hard Disk Drive (HDD), a Solid State Drive (SSD), a flash memory, or the like is used as the storage unit 12. A printing management program 12A for realizing a printing management function according to the exemplary embodiment is stored in the storage unit 12. The printing management program 12A may be stored in a ROM 11B.

The printing management program 12A may be previously installed, for example, in the printing management apparatus 10. The printing management program 12A may be realized by being stored in a non-volatile and non-transitory storage medium or being distributed through a network and by being appropriately installed in the printing management apparatus 10. As an example of the non-volatile and non-transitory storage medium, a Compact Disc Read Only Memory (CD-ROM), a magneto-optical disk, the HDD, a Digital Versatile Disc Read Only Memory (DVD-ROM), a flash memory, a memory card, and the like are assumed.

For example, a Liquid Crystal Display (LCD), an organic Electro Luminescence (EL) display, and the like are used as the display unit 13. The display unit 13 may integrally include a touch panel. The manipulation unit 14 is provided with, for example, a manipulation input device such as a keyboard or a mouse. The display unit 13 and the manipulation unit 14 receive various instructions from a user of the printing management apparatus 10. The display unit 13 displays various pieces of information such as results of a process performed according to the instructions received from the user or notifications with respect to the process.

The communication unit 15 is connected to the network, such as the Internet, a Local Area Network (LAN), or a Wide Area Network (WAN), and is capable of performing communication with each of the order reception server 60, the printing control server 70, and the post processing control server 80 through the network. The communication through the network may be the wired communication or the wireless communication.

However, as described above, in the post processing, grouping in the printing step is not taken into consideration, and thus there is a case where it is not possible to effectively perform the post processing after the printing.

Therefore, the CPU 11A of the printing management apparatus 10 according to the exemplary embodiment functions as below by writing and executing the printing management program 12A, which is stored in the storage unit 12, in the RAM 11C. The CPU 11A is an example of a processor.

In a case where a product is manufactured using the printing apparatus 71 and the post processing apparatus 81, the CPU 11A generates the printing schedule based on a printing group acquired by performing grouping on components included in the product for each attribute. The printing group is set such that it is possible to change a printing order of the components in the group. The CPU 11A generates the post processing schedule based on a post processing group acquired by performing the grouping on the product constituted by components included in the printing group. The post processing group is set such that it is possible to change a post processing order which is an order of execution of a job for executing the post processing for each product in the group. One or more printing groups may be provided, and, similarly, one or more post processing groups may be provided. Meanwhile, in a case where the rolled paper is used, one roller corresponds to one group.

Meanwhile, here, the product is a unit indicative of a combination of the components, and includes a publication, such as, a book, a magazine, or a brochure, as an example. In this case, the component includes the body, the cover, and the like which constitute the publication. In addition, the attribute indicates a type and a feature, and, as an example, the attribute includes various attributes, such as identification information of the customer and a type of the paper which is a printing target, including a customer Identification (ID) of the customer who orders the product, the number of colors of a front surface of the sheet, the number of colors of a rear surface of the sheet, a component ID, a paper ID, a paper dimension which shows a paper size, and the like. In addition, the component is set as a target of the grouping in the printing schedule, and the product is set as the target of the grouping in the post processing schedule.

In addition, the CPU 11A changes the post processing order of the product included in the post processing group according to a predetermined order. As an example, the predetermined order is a reverse order of a printing order of components included in the printing group. For example, in a case where the completely-printed rolled paper is applied to the post processing, a printed material which is initially printed becomes a back side of the rolled paper, and a printed material which is lastly printed becomes a front side of the rolled paper. Therefore, the post processing is initially performed on the lastly printed material, and the post processing is lastly performed on the initially printed material. Therefore, in a case where the post processing order is changed to the reverse order of the printing order, a post processing schedule, on which the post processing is appropriately performed according to a request of a finished product, is generated. Meanwhile, the predetermined order may be designated or selected by the user.

More specifically, the CPU 11A changes the printing order of the components included in the printing group in a late order of the scheduled shipping date of the product, and changes the post processing order of the product included in the post processing group in an early order of the scheduled shipping date of the product. Therefore, the post processing is performed in the early order of the scheduled shipping date of the product, and thus an efficiency of the post processing increases. Meanwhile, instead of the scheduled shipping date, a paper size, the number of needles of a staple, the number of paste operations, which indicates the number of pasting spots, or the like may be applied. In a case of the paper size, the printing order of the components included in the printing group is changed in small order of the paper size, and the post processing order of the product included in the post processing group is changed in decreasing order in the paper size. In addition, in a case of the number of needles of the staple, the printing order of the components included in the printing group is changed in a small order of the number of needles, and the post processing order of the product included in the post processing group is changed in decreasing order in the number of needles. In addition, in a case of the number of paste operations, the printing order of the components included in the printing group is changed in the small order of the number of paste operations, and the post processing order of the product included in the post processing group is changed in decreasing order in the number of paste operations.

In a case where there is a plurality of printing groups, the plurality of printing groups are set such that it is possible to change the printing order among the printing groups. In addition, in a case where there is a plurality of post processing groups, the plurality of post processing groups are set such that it is possible to change the post processing order among the post processing groups.

In this case, the CPU 11A changes the printing order of the plurality of printing groups according to the predetermined order, and changes the post processing order of the plurality of post processing groups according to an order which is identical to the predetermined order. As an example, the predetermined order is the early order of the scheduled shipping date of the product.

More specifically, in a case where the post processing group includes a plurality of products, the CPU 11A specifies, among the plurality of products, one product as a target of comparison with another post processing group according to a predetermined condition. As an example, the predetermined condition is a condition that the scheduled shipping date of the product is the earliest. In a case where the plurality of products are included in the post processing group in a case of the example, a product, the scheduled shipping date of which is the earliest, is specified as the target of the comparison, and the specified product is compared with a product of another post processing group.

In addition, in the post processing schedule, it is possible to perform at least one of change or deletion in units of a group on the plurality of post processing groups.

Subsequently, a printing schedule generation process will be described in detail with reference to FIG. 3.

Figure 3:
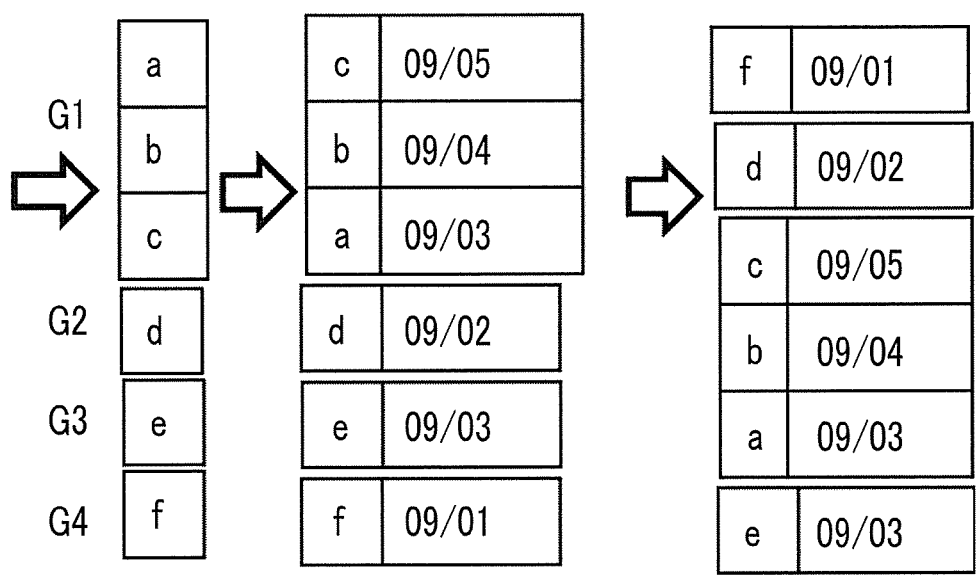
FIG. 3 is a diagram provided for description of a printing schedule generation process according to the exemplary embodiment.

FIG. 3 is a diagram provided for description of the printing schedule generation process according to the exemplary embodiment.

(S1) of FIG. 3 illustrates an example of the order reception information acquired from the order reception server 60.

As an example, the order reception information includes a product, a component, a customer ID, and a scheduled shipping date. In the example of FIG. 3, the product is a publication and the component is body.

(S2) of FIG. 3 illustrates a state in which the grouping is performed on components using the customer ID. A printing group G1 indicates a group including a component a, a component b, and a component c, the customer ID of which is "company A". A printing group G2 indicates a group including a component d, the customer ID of which is "company B". A printing group G3 indicates a group including a component e, the customer ID of which is "company C". A printing group G4 indicates a group including a component f, the customer ID of which is "company D".

(S3) of FIG. 3 illustrates a state in which the printing order of the components in the group is changed in the late order of the scheduled shipping date of the product. For example, in the printing group G1 of FIG. 3, the component c, the component b, and the component a are provided in the late order of the scheduled shipping date of the product. Therefore, in the printing group G1, the printing order is changed in order of the component c, the component b, and the component a.

(S4) of FIG. 3 illustrates a state in which the printing order among the groups is changed in the early order of the scheduled shipping date of the product. For example, since the plurality of components are included in the printing group G1 of FIG. 3, a scheduled shipping date of a component whose scheduled shipping date of the product is the earliest is set to a representative value ("09/03" in the example of FIG. 3) of the printing group G1. As a result, change is performed in order of the printing group G4, the printing group G2, the printing group G1, and the printing group G3. However, the scheduled shipping date of the printing group G1 and the scheduled shipping date of the printing group G3 have an identical value. In this case, for example, change is performed in order of submission. A result acquired in this manner becomes the printing schedule.

Subsequently, a post processing schedule generation process will be described in detail with reference to FIG. 4.

Figure 4:
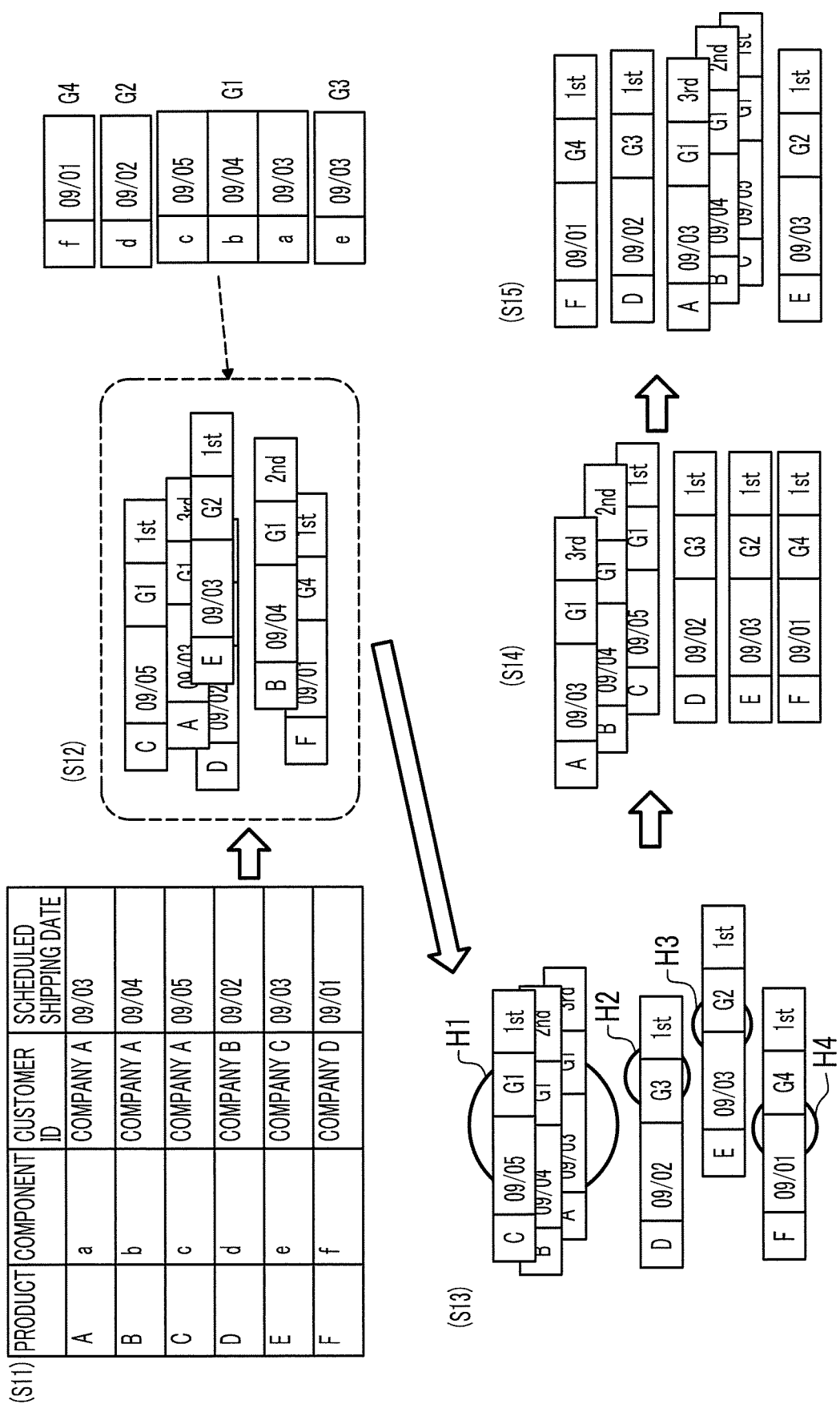
FIG. 4 is a diagram provided for description of a post processing schedule generation process according to the exemplary embodiment.

FIG. 4 is a diagram provided for description of the post processing schedule generation process according to the exemplary embodiment.

Similar to the example of FIG. 3, (S11) of FIG. 4 illustrates the order reception information acquired from the order reception server 60.

(S12) of FIG. 4 illustrates a product group which is a target of the post processing schedule. In the post processing schedule, a product of the component included in the printing schedule illustrated in the example of FIG. 3 is set to a target.

(S13) of FIG. 4 illustrates a state in which grouping is performed on the products constituted by the components included in the printing group of FIG. 3. For example, the printing group G1 corresponds to a post processing group H1. Similarly, the printing group G2 corresponds to a post processing group H2, the printing group G3 corresponds to a post processing group H3, and the printing group G4 corresponds to a post processing group H4.

(S14) of FIG. 4 illustrates a state in which the post processing order of the products in the group is changed to a reverse order of the printing order of the components included in the printing group. For example, the post processing order of the products included in the post processing group H1 of FIG. 4 is changed to the reverse order of the printing order of the components of the printing group G1.

In this case, change is performed in order of a product A, a product B, and a product C, that is, in early order of the scheduled shipping date.

(S15) of FIG. 4 illustrates a state in which the post processing order among the groups is changed in early order of the scheduled shipping date of the product. For example, since the plurality of products are included in the post processing group H1 of FIG. 4, a scheduled shipping date of the product whose scheduled shipping date of the product is the earliest is set to a representative value ("09/03" in the example of FIG. 4) of the post processing group H1. As a result, change is performed in order of the post processing group H4, the post processing group H2, the post processing group H1, and the post processing group H3. However, the scheduled shipping date of the post processing group H1 and the scheduled shipping date of the post processing group H3 have an identical value. In this case, the change is performed, for example, in order of submission. A result acquired in this manner becomes the post processing schedule. Meanwhile, as described above, the post processing schedule is set such that it is possible to perform at least any one of change or deletion in units of a group on the plurality of post processing groups.

Subsequently, an operation of the printing management apparatus 10 according to the exemplary embodiment will be described with reference to FIG. 5.

Figure 5:
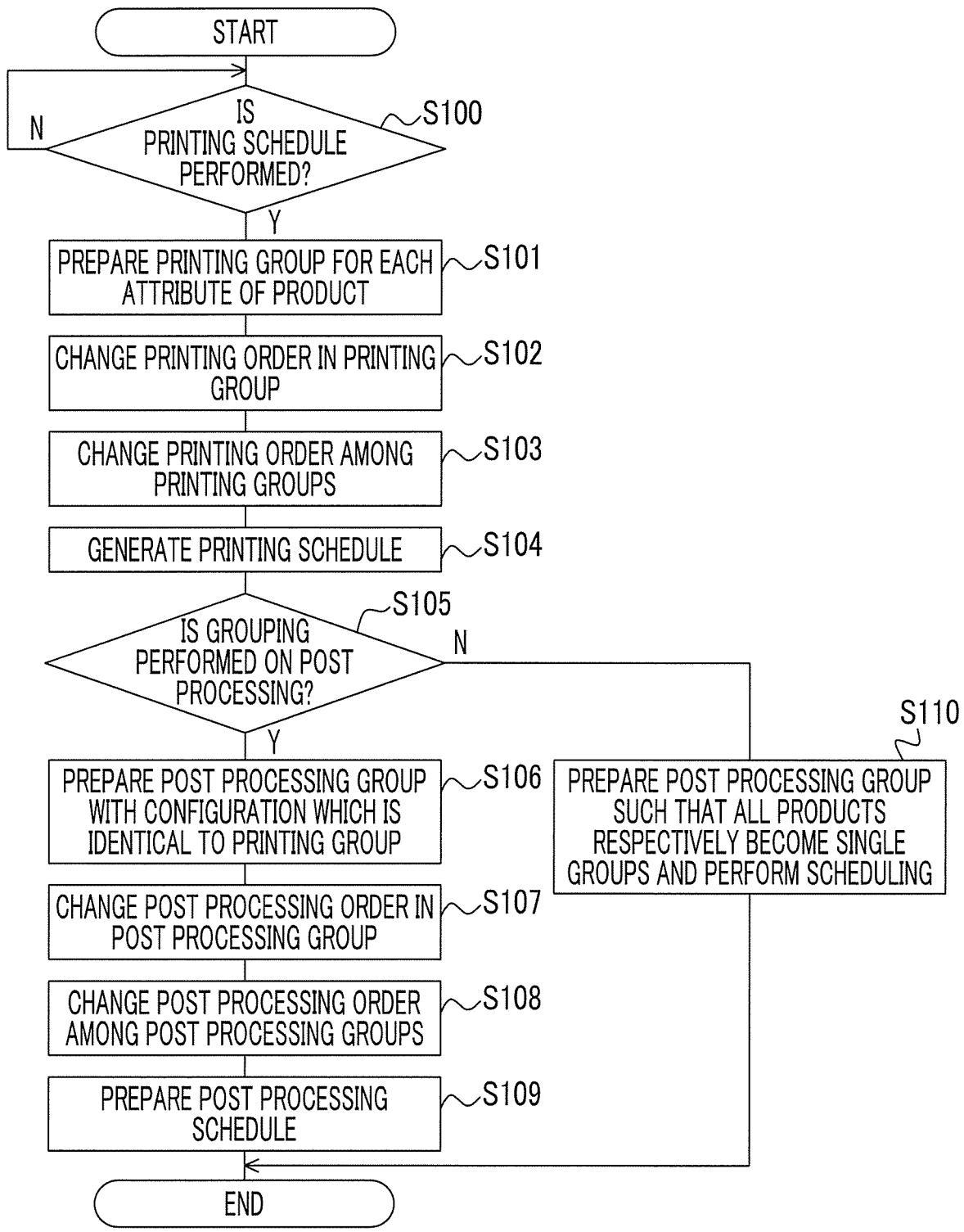
FIG. 5 is a flowchart illustrating an example of a flow of a process performed by a printing management program according to the exemplary embodiment.

FIG. 5 is a flowchart illustrating an example of a flow of a process performed by the printing management program 12A according to the exemplary embodiment.

First, in a case where the printing management apparatus 10 is turned on and is activated, the printing management program 12A is activated and respective steps below are executed.

In Step S100 of FIG. 5, the CPU 11A determines whether or not setting is performed such that the printing schedule is performed. In a case where it is determined that the setting is performed such that the printing schedule is performed (in a case of positive determination), the process proceeds to Step S101. In a case where it is not determined that the setting is performed such that the printing schedule is performed (in a case of negative determination), the process is waiting in Step S100.

In Step S101, as an example, the CPU 11A prepares the printing groups by performing grouping on the components, which constitute the product, for each attribute, as illustrated in above-described (S2) of FIG. 3. Specifically, in the example of FIG. 3, the printing groups G1 to G4 are prepared using the customer ID as the attribute.

In Step S102, as an example, the CPU 11A changes the printing order of the components in the printing groups, as illustrated in above-described (S3) of FIG. 3. Specifically, in the example of FIG. 3, the rolled paper is used, and the printing order of the components in the printing group G1 is changed in the late order of the scheduled shipping date.

In Step S103, as an example, the CPU 11A, the printing order among the printing groups is changed, as illustrated in above-described (S4) of FIG. 3. Specifically, in the example of FIG. 3, the printing order among the printing groups G1 to G4 is changed in early order of the scheduled shipping date. Meanwhile, since the plurality of components are included in the printing group G1, among the scheduled shipping dates of the plurality of components, the earliest scheduled shipping date ("09/03" in the example of FIG. 3) is specified as a comparison target. In addition, in a case where the scheduled shipping date is identical among the printing groups, the change is performed, for example, in order of submission.

In Step S104, the CPU 11A generates the printing schedule based on the printing groups in which the printing order is changed in Step S103.

In Step S105, the CPU 11A determines whether or not to perform grouping on the post processing according to content which is set by the user. In a case where it is determined to perform grouping on the post processing (in a case of positive determination), the process proceeds to Step S106. In a case where it is determined to not perform grouping on the post processing (in a case of negative determination), the process proceeds to Step S110.

In Step S106, as an example, the CPU 11A prepares the post processing groups by performing grouping on a configuration, which is identical to the printing groups, that is, the products constituted by the components included in the printing groups, as above-described (S13) of FIG. 4. Specifically, in the example of FIG. 4, the post processing groups H1 to H4 are prepared to correspond to the printing groups G1 to G4.

In Step S107, as an example, the CPU 11A changes the post processing order of the products in the post processing groups, as above-described (S14) of FIG. 4. Specifically, in the example of FIG. 4, the rolled paper is used as described above, and the post processing order of the products in the post processing group H1 is changed in early order of the scheduled shipping date.

In Step S108, as an example, the CPU 11A changes the post processing order among the post processing groups, as above-described (S15) of FIG. 4. Specifically, in the example of FIG. 4, the post processing order of the post processing groups H1 to H4 is changed in early order of the scheduled shipping date. Meanwhile, since the post processing group H1 includes the plurality of products, among the scheduled shipping dates of the plurality of products, the earliest scheduled shipping date ("09/03" in the example of FIG. 4) is specified as the comparison target. In addition, in a case where the scheduled shipping date is identical among the post processing groups, the change is performed, for example, in order of submission.

In Step S109, the CPU 11A generates the post processing schedule based on the post processing group whose post processing order is changed in Step S108, and ends a series of processes performed by the printing management program 12A.

In contrast, in Step S110, the CPU 11A prepares the post processing group such that all the products respectively become single groups, performs scheduling, and ends the series of processes performed by the printing management program 12A.

Subsequently, examples of screens relevant to the printing schedule generation process and the post processing schedule generation process according to the exemplary embodiment will be described with reference to FIGS. 6 to 13.

FIG. 6 is a front diagram illustrating an example of a printing group list screen according to the exemplary embodiment.

The printing group list screen illustrated in FIG. 6 is displayed on the display unit 13 according to a manipulation performed by the user. Meanwhile, the printing group list screen may be displayed on an external PC which is capable of accessing the printing management apparatus 10. In the printing group list screen, a group job ID and a product job ID, which is included in the group job ID, are displayed. In addition, as an example, a customer information-name, a product name, a component number, component name, a component status, and the like are displayed in association with the product job ID.

FIG. 7 is a front diagram illustrating an example of a post processing group list screen according to the exemplary embodiment.

The post processing group list screen illustrated in FIG. 7 is displayed on the display unit 13 according to the manipulation performed by the user. Meanwhile, similar to the example of FIG. 6, the post processing group list screen may be displayed on the external PC which is capable of accessing the printing management apparatus 10. In the post processing group list screen, a processing group ID is displayed. In addition, as an example, the product job ID, scheduled shipping date and time, the customer information-name, the product name, and the like are displayed in association with the processing group ID.

FIG. 8 is a front diagram illustrating an example of a post processing schedule screen according to the exemplary embodiment.

The post processing schedule screen illustrated in FIG. 8 is displayed on the display unit 13 according to the manipulation performed by the user. Meanwhile, similar to the example of FIG. 6, the post processing schedule screen may be displayed on the external PC which is capable of accessing the printing management apparatus 10. In the post processing schedule screen, product information is displayed together with the processing group ID. In the product information, as an example, the product job ID, the number of copies, the product name, the product status, and the like are displayed in association with the processing order.

FIG. 9 is a front diagram illustrating an example of a screen for setting a printing-grouping attribute according to the exemplary embodiment.

The screen for setting the printing-grouping attribute illustrated in FIG. 9 is displayed on the display unit 13 according to the manipulation performed by the user. Meanwhile, similar to the example of FIG. 6, the screen for setting the printing-grouping attribute may be displayed on the external PC which is capable of accessing the printing management apparatus 10. The screen for setting the printing-grouping attribute is a screen for setting of an attribute to be applied in a case where the grouping is performed on the components which constitute the product. As an example, the attribute includes various attributes, such as the customer ID, the number of colors on the front surface of the sheet, the number of colors on the rear surface of the sheet, the component ID, the paper ID, and the paper dimension, as described above.

FIG. 10 is a front diagram illustrating an example of a screen for setting general scheduling according to the exemplary embodiment.

The screen for setting the general scheduling illustrated in FIG. 10 is displayed on the display unit 13 according to the manipulation performed by the user. Meanwhile, similar to the example of FIG. 6, the screen for setting the general scheduling may be displayed on the external PC which is capable of accessing the printing management apparatus 10. As an example, in the screen for setting the general scheduling, "scheduling" is selected and designated. In this case, "align processing with group configuration of body" may be selected and designated. Here, the body is an example of the component. In a case where the "align processing with group configuration of body" is selected and designated, the post processing group is prepared by taking the printing groups into consideration. In addition, in the case where the "align processing with group configuration of body" is selected and designated, "align in reverse order of printing" or "align in identical order of printing" may be selected and designated. Here, "align in reverse order of printing" is selected and designated.

FIG. 11 is a front diagram illustrating an example of a screen for setting a priority in the printing group according to the exemplary embodiment.

The screen for setting the priority in the printing group illustrated in FIG. 11 is displayed on the display unit 13 according to the manipulation performed by the user. Meanwhile, similar to the example of FIG. 6, the screen for setting the priority in the printing group may be displayed on the external PC which is capable of accessing the printing management apparatus 10. The screen for setting the priority in the printing group is a screen for selecting and designating a sorting condition in a case where the printing order of the components in the printing group is sorted. As an example, the sorting condition includes the number of pages, a finished area, a processing type ID, a job ID, the shortest scheduled shipping date and time, the total number of pages (the number of pages×the number of copies), and the like.

FIG. 12 is a front diagram illustrating an example of a screen for setting the priority among the printing groups according to the exemplary embodiment.

The screen for setting the priority among the printing groups illustrated in FIG. 12 is displayed on the display unit 13 according to the manipulation performed by the user. Meanwhile, similar to the example of FIG. 6, the screen for setting the priority among the printing groups may be displayed on the external PC which is capable of accessing the printing management apparatus 10. The screen for setting the priority among the printing groups is a screen for selecting and designating the sorting condition in a case where the printing order among the printing groups is sorted. As an example, the sorting condition includes a due date, the number of pages, the number of copies, a pagination number, a processing type ID, the order of submission, and the like.

FIG. 13 is a front diagram illustrating an example of a screen for setting the priority among the post processing groups according to the exemplary embodiment.

The screen for setting the priority among the post processing groups illustrated in FIG. 13 is displayed on the display unit 13 according to the manipulation performed by the user. Meanwhile, similar to the example of FIG. 6, the screen for setting the priority among the post processing groups may be displayed on the external PC which is capable of accessing the printing management apparatus 10. The screen for setting the priority among the post processing groups is a screen for selecting and designating the sorting condition in a case where the post processing order among the post processing groups is sorted. As an example, the sorting condition includes a scheduled date of an operation for an item, a format ID, a paper ID, existence/non-existence of use of paste, the number of needles, shapes of the needles, the scheduled shipping date and time, and the like.

As described above, according to the exemplary embodiment, the post processing group having a configuration identical to the printing group is prepared by taking the printing group, which is acquired by performing grouping on the components included in the product, into consideration. In the post processing group, it is possible to change the post processing order in the group and among the groups, and thus the post processing after the printing is effectively managed.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Hereinabove, the printing management apparatus according to the exemplary embodiment is described as an example. The exemplary embodiment may have a form of a program for causing a computer to execute functions of the respective units included in the printing management apparatus. The exemplary embodiment may have a form of a computer-readable non-transitory storage medium which stores the program.

In addition, the configuration of the printing management apparatus described in the exemplary embodiment is an example, and may be changed according to a situation in a scope without departing from a gist.

In addition, the flow of the process of the program described in the exemplary embodiment is also an example. Unnecessary steps may be deleted, new steps may be added, and a processing order may be replaced in the scope without departing from the gist.

In addition, in the exemplary embodiment, a case is described where, in a case where the program is executed, the process according to the exemplary embodiment is realized using a computer through a software configuration. However, the exemplary embodiment is not limited thereto. The exemplary embodiment may be realized through, for example, a hardware configuration and a combination of the hardware configuration and the software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing management apparatus comprising:
a processor configured to
obtain infoiniation of one or more groups composed of components having a same attribute,
generate a printing schedule so that components in a same group are continuously printed by a same printing apparatus, and
generate a post processing schedule so that the components in the same group are processed by a same post processing apparatus.

2. The printing management apparatus according to claim 1,
wherein the processor generates the post processing schedule so that the components in the same group are continuously processed by the same post processing apparatus.

3. The printing management apparatus according to claim 2, wherein the processor generates the post processing schedule so that a post processing order of the components in the same group is a reverse order of a printing order of the components in the same group.

4. The printing management apparatus according to claim 3,
wherein the processor generates the printing schedule so that the printing order of the components in the same group is a late order of a scheduled shipping date of products corresponding to the components.

5. The printing management apparatus according to claim 3,
wherein the processor generates the post processing schedule so that the post processing order of the components in the same group is an early order of the scheduled shipping date of products corresponding to the components.

6. The printing management apparatus according to claim 1,
wherein, in a case that there is a plurality of groups composed of components, the processor generates the printing schedule so that a group which meets a predetermined condition are preferentially printed, and generates the post processing schedule so that the group which meets the predetermined condition are preferentially post processed.

7. The printing management apparatus according to claim 2,
wherein, in a case that there is a plurality of groups composed of components, the processor generates the printing schedule so that a group which meets a predetermined condition are preferentially printed, and generates the post processing schedule so that the group which meets the predetermined condition are preferentially post processed.

8. The printing management apparatus according to claim 3,
wherein, in a case that there is a plurality of groups composed of components, the processor generates the printing schedule so that a group which meets a predetermined condition are preferentially printed, and generates the post processing schedule so that the group which meets the predeteiiiiined condition are preferentially post processed.

9. The printing management apparatus according to claim 4,
wherein, in a case that there is a plurality of groups composed of components, the processor generates the printing schedule so that a group which meets a predetermined condition are preferentially printed, and generates the post processing schedule so that the group which meets the predetermined condition are preferentially post processed.

10. The printing management apparatus according to claim 5,
wherein, in a case that there is a plurality of groups composed of components, the processor generates the printing schedule so that a group which meets a predetermined condition are preferentially printed, and generates the post processing schedule so that the group which meets the predetermined condition are preferentially post processed.

11. The printing management apparatus according to claim 6,
wherein the group which meets the predetermined condition is a group in which the scheduled shipping date of the products corresponding to its components is earlier than scheduled shipping dates of products corresponding to components included in other groups.

12. The printing management apparatus according to claim 7,
wherein the group which meets the predetermined condition is a group in which the scheduled shipping date of the products corresponding to its components is earlier than scheduled shipping dates of products corresponding to components included in other groups.

13. The printing management apparatus according to claim 8,
wherein the group which meets the predetermined condition is a group in which the scheduled shipping date of the products corresponding to its components is earlier than scheduled shipping dates of products corresponding to components included in other groups.

14. The printing management apparatus according to claim 9,
wherein the group which meets the predetermined condition is a group in which the scheduled shipping date of the products corresponding to its components is earlier than scheduled shipping dates of products corresponding to components included in other groups.

15. The printing management apparatus according to claim 10,
wherein the group which meets the predetermined condition is a group in which the scheduled shipping date of the products corresponding to its components is earlier than scheduled shipping dates of products corresponding to components included in other groups.

16. The printing management apparatus according to claim 11,
wherein the processor specifies one product from a plurality of products constituted by components in a group,
compares the scheduled shipping date of the specified product with a scheduled shipping date of a product specified from a plurality of products constituted by components in another group, and
specifies the group which meets the predetermined condition.

17. The printing management apparatus according to claim 12,
wherein the processor specifies one product from a plurality of products constituted by components in a group,
compares the scheduled shipping date of the specified product with a scheduled shipping date of a product specified from a plurality of products constituted by components in another group, and
specifies the group which meets the predetermined condition.

18. The printing management apparatus according to claim 13,
wherein the processor specifies one product from a plurality of products constituted by components in a group,
compares the scheduled shipping date of the specified product with a scheduled shipping date of a product specified from a plurality of products constituted by components in another group, and
specifies the group which meets the predetermined condition.

19. The printing management apparatus according to claim 6,
wherein the processor obtains infoitnation selecting one group from a plurality of groups, and changes or deletes all post processing schedule of components included in the selected group.

20. A non-transitory computer readable medium storing a printing management program causing a computer to perforin a process comprising:
obtaining information of groups composed of one or more components having a same attribute,
generating a printing schedule so that components in a same group are continuously printed by a same printing apparatus; and
generating a post processing schedule so that components in the same group are processed by a same post processing apparatus.

\* \* \* \* \*